(12) United States Patent
Akaishi

(10) Patent No.: US 7,447,350 B2
(45) Date of Patent: Nov. 4, 2008

(54) COLOR DIFFERENCE JUDGMENT APPARATUS AND METHOD

(75) Inventor: Takahisa Akaishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 10/704,599

(22) Filed: Nov. 12, 2003

(65) Prior Publication Data

US 2004/0101195 A1 May 27, 2004

(30) Foreign Application Priority Data

Nov. 27, 2002 (JP) .............................. 2002-344575

(51) Int. Cl.
*G06K 9/62* (2006.01)

(52) U.S. Cl. ...................... 382/161; 382/156; 382/162; 358/504; 358/516

(58) Field of Classification Search ................ 382/161; 364/526; 358/504
See application file for complete search history.

(56) References Cited

U.S. PATENT DOCUMENTS

| | | | | |
|---|---|---|---|---|
| 5,202,935 A | * | 4/1993 | Kanamori et al. | ............ 382/162 |
| 5,218,555 A | * | 6/1993 | Komai et al. | ................. 382/156 |
| 5,619,347 A | * | 4/1997 | Taniguchi et al. | ........... 358/516 |
| 5,751,450 A | * | 5/1998 | Robinson | ..................... 358/504 |
| 6,963,426 B2 | | 11/2005 | Odagiri et al. | ................ 358/1.9 |

FOREIGN PATENT DOCUMENTS

| | | |
|---|---|---|
| JP | 08-171639 | 7/1996 |
| JP | 2002-027267 | 1/2002 |
| JP | 2002-112053 | 4/2002 |
| JP | 2002-112058 | 4/2002 |

OTHER PUBLICATIONS

Shigeru Oguro et al., "A Color Image Quantization Method Considering Human Vision Characteristics",IEICE Tech. Report, vol. 91, No. 527, Japan pp. 41-48, Mar. 18, 1992.

\* cited by examiner

*Primary Examiner*—Samir A Ahmed
*Assistant Examiner*—Aklilu K Woldemariam
(74) *Attorney, Agent, or Firm*—Fitzpatrick, Cella, Harper & Scinto

(57) ABSTRACT

The present invention is related to a color difference judgment apparatus for judging a color difference between a first color and a second color in RGB color space. The method is comprising: distance calculating means for calculating distance between the first and second colors in RGB color space; threshold-value candidate storage means for storing a plurality of threshold-value candidates; threshold-value selecting means for selecting a threshold value from among the plurality of threshold-value candidates that have been stored in the threshold-value candidate storage means; and comparing decision means for comparing the distance calculated by the distance calculating means and the threshold value selected by the threshold-value selecting means and deciding that the color difference between the first and second colors lies within an allowable range if the distance is less than the threshold value.

10 Claims, 3 Drawing Sheets

COLOR DIFFERENCE JUDGMENT APPARATUS AND METHOD

FIELD OF THE INVENTION

This invention relates to a technique for judging whether the color difference between two colors in RGB color space is within a predetermined allowable range to the same degree as the judgment is made in CIELab uniform color space.

BACKGROUND OF THE INVENTION

A film scanner that reads a transparent original such as film as by a one-dimensional image sensor is known in the art. More recently, a film scanner having a so-called dust and scratch eliminating function has been developed. This film scanner detects dust and scratches on film by an infrared-read operation in addition to the reading of the actual image based upon visible light and corrects the actual-image information by image processing to thereby furnish an image that is free of dust and scratches.

In the actual-image correction that removes dust and scratches, deficient pixels are corrected for by interpolation processing using normal pixels surrounding a pixel that corresponds to the flawed portion (such a pixel shall be referred to as a deficient pixel). In such interpolation processing, a technique often used is to determine whether the colors of the surrounding normal pixels used in interpolation are colors close to each other. That is, in a case where a first normal pixel (R1, G1, B1) and a second normal pixel (R2, G2, B2) peripheral to a deficient pixel are used in interpolation processing, it is judged whether the color difference between the first and second normal pixels falls within a predetermined allowable range.

A first method of performing this determination is to calculate a difference D between the first and second normal pixels in RGB color space and comparing the value of D with a predetermined threshold value (e.g., THRGB). If D<THRGB holds in this case, it is judged that the two pixels have colors that are close to each other. Here the distance D is calculated using the following equation:

$$D=[(R1-R2)^2+(G1-G2)^2+(B1-B2)^2]^{1/2}$$

A second method that differs from the first method also is available. According to the second method, it is assumed that the RGB values of actual-image data output from a film scanner are in conformity with sRGB color space, which is the standard RGB color space. The RGB values of the first and second normal pixels are converted to data in CIELab color space, which is uniform color space, and a color difference $\Delta E^*ab$ between these two colors is compared with a predetermined threshold value THLab. In this method also it is judged that the two pixels are colors that are close to each other in a case where the color difference between the two colors satisfies the relation $\Delta E^*ab<THLab$.

The conversion from SRGB color space to CIELab color space and the method of calculating the color difference $\Delta E^*ab$ will now be described. The RGB data is assumed to be 8-bit data. First, a conversion from sRGB color space to XYZ color space is performed using the following equations:

$$R'_{sRGB}=R_{8bit}/255.0;$$

$$G'_{sRGB}=G_{8bit}/255.0;$$

$$B'_{sRGB}=B_{8bit}/255.0;$$

when $R'_{sRGB}, G'_{sRGB}, B'_{sRGB} \leq 0.04045$ holds, $$R_{sRGB}=R'_{sRGB}/12.92;$$

$$G_{sRGB}=G'_{sRGB}/12.92;$$

$$B_{sRGB}=B'_{sRGB}/12.92; \text{ and}$$

when $R'_{sRGB}, G'_{sRGB}, B'_{sRGB} > 0.04045$ holds, $$R_{sRGB}=[(R'_{sRGB}+0.055)/1.055]^{2.4}$$

$$G_{sRGB}=[(G'_{sRGB}+0.055)/1.055]^{2.4}$$

$$B_{sRGB}=[(B'_{sRGB}+0.055)/1.055]^{2.4}$$

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix}$$

Next, a conversion from XYZ color space to CIELab color space is performed using the following equations:

$$L^*=116(Y/Y_n)^{1/3}-16 \text{ when } Y/Y_n>0.008856 \text{ holds,}$$

$$L^*=903.29(Y/Y_n)^{1/3} \text{ when } Y/Y_n \leq 0.008856 \text{ holds;}$$

Y: Y value of tristimulus values in the XYZ colorimetric system, $Y_n$: Y value based upon a standard illuminant of a perfect diffuse reflection surface;

$$a^*=500[f(X/X_n)-f(Y/Y_n)]$$

$$b^*=200[f(Y/Y_n)-f(Z/Z_n)]$$

where $f(X/X_n)=(X/X_n)^{1/3}$ when $X/X_n>0.008856$ holds;
$f(X/X_n)=7.78(X/X_n)+16/116$ when $X/X_n \leq 0.008856$ holds;
$f(Y/Y_n)=(Y/Y_n)^{1/3}$ when $Y/Y_n>0.008856$ holds;
$f(Y/Y_n)=7.78(Y/Y_n)+16/116$ when $Y/Y_n \leq 0.008856$ holds;
$f(Z/Z_n)=(Z/Z_n)^{1/3}$ when $Z/Z_n>0.008856$ holds;
$f(Z/Z_n)=7.78(Z/Z_n)+16/116$ when $Z/Z_n \leq 0.008856$ holds; and X, Y, Z: values of tristimulus values in the XYZ colorimetric system, and $X_n, Y_n, Z_n$: values of X, Y, Z based upon a standard illuminant of a perfect diffuse reflection surface.

Calculation of the color difference $\Delta E^*ab$ in CIELab color space is performed using the following equation:

$$\Delta E^*ab=[(\Delta L^*)^2+(\Delta a^*)^2+(\Delta b^*)^2]^{1/2}$$

where the following holds:

$$\Delta L^*=L2^*-L1^*$$

$$\Delta a^*=a2^*-a1^*$$

$$\Delta b^*=b2^*-b1^*$$

However, the above-described methods of judging color difference according to the prior art involve certain problems. Specifically, with the first method of judging color difference based upon the distance D in RGB color space between the colors of two normal pixels, RGB color space itself is not uniform with respect to the sense of vision in humans and, hence, there is no correlation to this human sense. For example, if the distance D in a dark area and the distance D in a bright area are compared, human vision is such that a disparity in color is easier to perceive in a dark area than in a bright area even though the distance D between two colors in RGB color space is the same.

Further, with the second method of converting RGB data to data in CIELab color space, which is uniform color space, and judging color difference based upon the calculated color difference $\Delta E*ab$, the fact that the comparison is made in uniform color space means that there is some correlation to the human vision. However, since the calculation load for the conversion from RGB to $L*a*b*$ is large, processing takes time and a problem arises in a case where processing must be executed in real time, as when processing for eliminating dust and scratches is executed.

SUMMARY OF THE INVENTION

The present invention has been proposed to solve the problems of the prior art and its object is to provide a color difference judgment apparatus and method whereby the judgment as to whether the color difference between two colors in RGB color space falls within a predetermined allowable range can be performed to the same degree as the judgment based upon human vision and at high speed.

According to the present invention, the foregoing object is attained by providing a color difference judgment apparatus for judging a color difference between a first color and a second color in RGB color space, comprising: distance calculating means for calculating distance between the first and second colors in RGB color space; threshold-value candidate storage means for storing a plurality of threshold-value candidates; threshold-value selecting means for selecting a threshold value from among the plurality of threshold-value candidates that have been stored in the threshold-value candidate storage means; and comparing decision means for comparing the distance calculated by the distance calculating means and the threshold value selected by the threshold-value selecting means and deciding that the color difference between the first and second colors lies within an allowable range if the distance is less than the threshold value.

Further, according to the present invention, the foregoing object is attained by providing a color difference judgment method for judging a color difference between a first color and a second color in RGB color space, comprising the steps of: calculating distance between the first and second colors in RGB color space; selecting a threshold value from among a plurality of threshold-value candidates; and comparing the calculated distance and the threshold value selected and deciding that the color difference between the first and second colors lies within an allowable range if the distance is less than the threshold value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail with reference to the drawings.

First Embodiment

A first embodiment will be described taking as an example a case where it is determined whether the color difference between two colors C1 (R1, G1, B1) and C2 (R2, G2, B2) in conformity with sRGB color space is less than a color difference $\Delta E*ab=K$ (where K is a positive real number) in CIELab color space.

Figure 1:
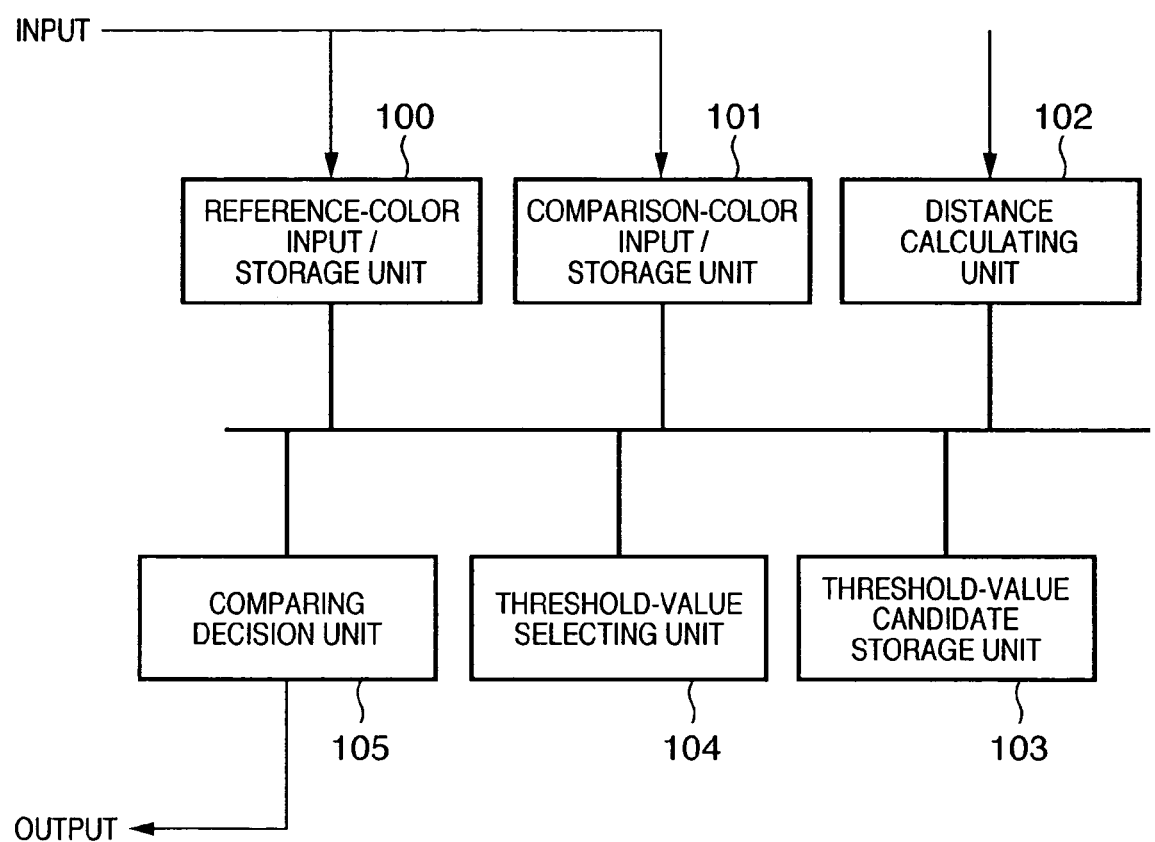
FIG. 1 is a block diagram illustrating the structure of an image processing apparatus for executing a color difference judgment method according to a first embodiment of the present invention.

FIG. 1 is a block diagram illustrating the structure of an image processing apparatus (color difference judgment apparatus) for executing a color difference judgment method according to the first embodiment of the present invention. As shown in FIG. 1, the apparatus includes a reference-color input/storage unit 100 for entering and storing RGB values of a pixel serving as a reference color; a comparison-color input/storage unit 101 for entering and storing RGB values of a pixel serving as a comparison color for being compared with the reference color; and a distance calculating unit 102 for calculating the distance D between the reference color and the comparison color in RGB color space. The distance calculating unit 102 calculates the distance D between the two colors using the following equation:

$$D=(R1-R2)^2+(G1-G2)^2+(B1-B2)^2$$

More specifically, the image processing apparatus according to this embodiment is characterized in that if the RGB values of a first color are (R1, G1, B1) and the RGB values of a second color are (R2, G2, B2), the distance calculating unit 102 calculates, as the distance, a value found from $D=(R1-R2)^2+(G1-G2)^2+(B1-B2)^2$.

The apparatus further includes a threshold-value candidate storage unit 103 in which have been stored threshold values for judging color difference in each partial space of RGB color space, and a threshold-value selecting unit 104 for selecting a desired threshold value from among the threshold values that have been stored in the threshold-value candidate storage unit 103.

The apparatus further include a comparing decision unit 105 for comparing the threshold value with the distance in RGB color space calculated by the distance calculating unit 102 and judging whether the color difference between the two colors is less than $\Delta E*ab=K$. This color difference judgment apparatus is implemented by installing application software, which is for executing the processing of flowchart FIG. 2 described below, in a personal computer.

Figure 2:
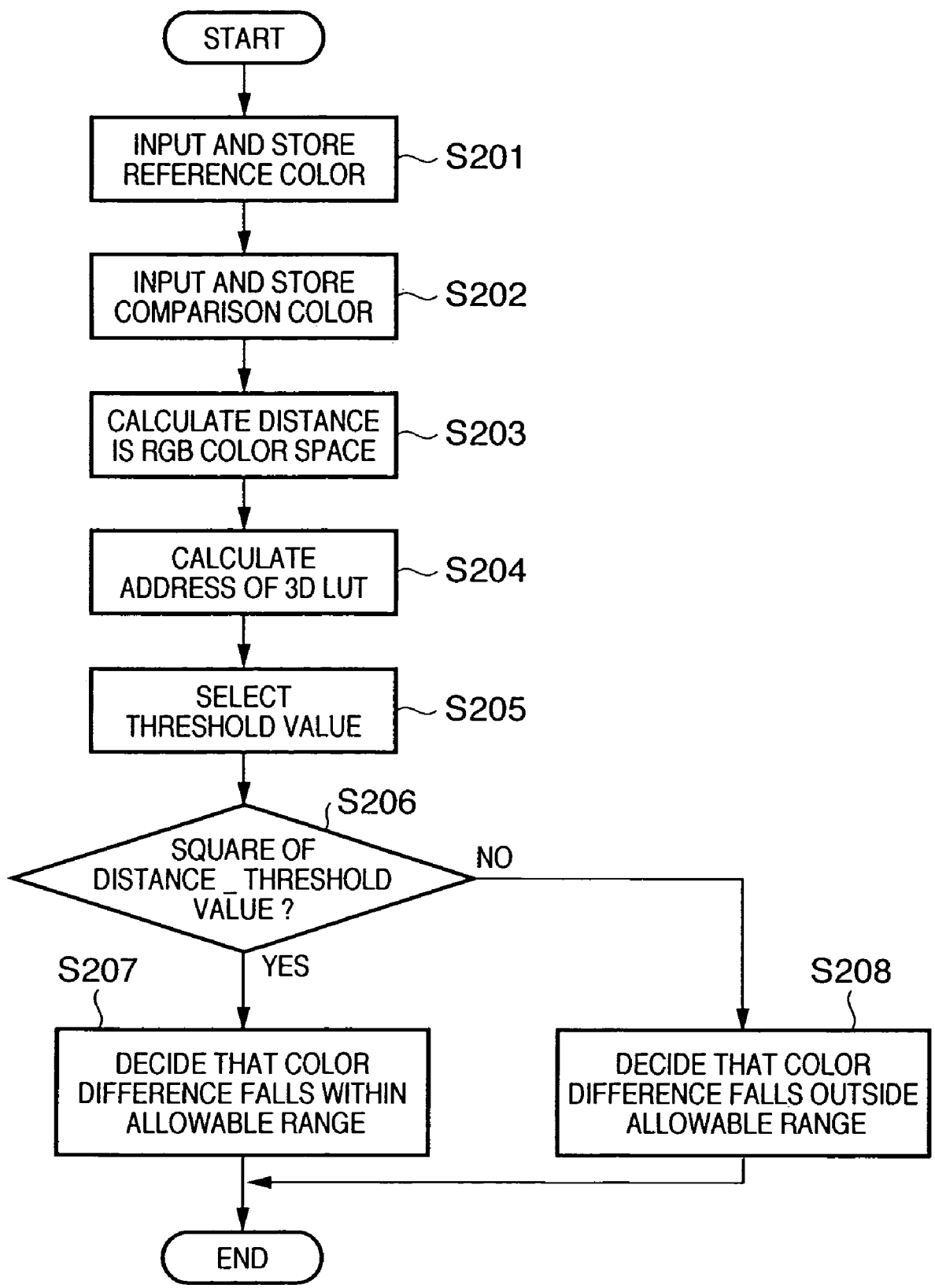
FIG. 2 is a flowchart useful in describing the procedure of the color difference judgment method according to this embodiment.

FIG. 2 is a flowchart useful in describing the procedure of the color difference judgment method according to this embodiment.

First, a color serving as the reference color is input and stored in the reference-color input/storage unit 100 (step S201). That is, the color C1 or C2 is input to the reference-color input/storage unit 100. According to this embodiment, it is assumed by way of example that C1 is input as the reference color.

Next, a color serving as the comparison color is input and stored in the comparison-color input/storage unit 101 (step S202). At this time C2 is input as the comparison color if C1 was input as the reference color at step S201 and C1 is input as the comparison color if C2 was input as the reference color at step S201. In this embodiment, C2 is input to the comparison-color input/storage unit 101 as the comparison color.

Next, the distance D between the reference color and comparison color in RGB color space is calculated by the distance calculating unit 102 (step S203). Though calculation of the distance D may use the equation cited below, calculation time can be shortened if use is made of the above-cited calculation formula that does not calculate a square root.

$$D=[(R1-R2)^2+(G1-G2)^2+(B1-B2)^2]^{1/2}$$

Specifically, the image processing apparatus according to this embodiment is characterized in that if the RGB values of the first color are (R1, G1, B1) and the RGB values of the second color are (R2, G2, B2), then the distance calculating unit 102 calculates, as the distance, a value found from $D=[(R1-R2)^2+(G1-G2)^2+(B1-B2)^2]^{1/2}$.

Next, the address of a three-dimensional LUT (3D LUT) in which the threshold-value candidates have been stored is calculated (step S204). The details of this calculation will be described later.

The threshold-value selecting unit 104 selects a threshold value to be used for comparison purposes from among the threshold-value candidates that have been stored in the threshold-value candidate storage unit 103 (step S205). According to this embodiment, data (a threshold-value candidate) in the three-dimensional look-up table corresponding to the address thereof calculated at step S204 is set as the threshold value.

More specifically, the image processing apparatus according to this embodiment is characterized in that the threshold-value selecting unit 104 selects, from the plurality of threshold-value candidates that have been stored in the threshold-value candidate storage unit 103, a threshold value in the part of color space to which either the first color (e.g., C1) or the second color (e.g., C2) belongs. Further, the image processing apparatus according to this embodiment is characterized in that the threshold-value candidate storage unit 103 stores threshold-value candidates in the form of a three-dimensional look-up table and the threshold-value selecting unit 104 selects a threshold value uniquely upon referring to the three-dimensional look-up table based upon the RGB values of the color serving as the reference.

Next, the comparing decision unit 105 compares the distance calculated in RGB color space at step S203 and the threshold value selected at step S205 (step S206). If the result of the comparison is that the distance (or the square of the distance) is equal to or less than the threshold value ("YES" at step S206), then the comparing decision unit 105 decides that the color difference between the two colors C1 and C2 is equal to or less than the color difference $\Delta E^*ab=K$ (i.e., that the color difference falls within the allowable range) and outputs this result (step S207).

On the other hand, if the result of the comparison is that the distance (or the square of the distance) is greater than the threshold value ("NO" at step S206), then the comparing decision unit 105 decides that the color difference between the two colors C1 and C2 is greater than the color difference $\Delta E^*ab=K$ (i.e., that the color difference falls outside the allowable range) and outputs this result (step S208). It should be noted that an arrangement may be adopted in which the comparison of step S206 is performed in a case where the distance (the square of the distance) is equal to or less than the threshold value and in a case where the distance (the square of the distance) is greater than the threshold value.

As mentioned above, the image processing apparatus (color difference judgment apparatus) according to this embodiment judges the color difference between the first and second colors in RGB color space. In addition, the image processing apparatus is characterized by comprising the distance calculating unit 102 for calculating the distance between the first and second colors in RGB color space; the threshold-value candidate storage unit 103 for storing a plurality of threshold-value candidates; the threshold-value selecting unit 104 for selecting a threshold value from among the plurality of threshold-value candidates that have been stored in the threshold-value candidate storage unit 103; and the comparing decision unit 105 for comparing the distance calculated by the distance calculating unit 102 and the threshold value selected by the threshold-value selecting unit 104 and deciding that the color difference between the first and second colors lies within an allowable range if the distance is less than the threshold value.

Details relating to the threshold-value candidates that have been stored in the threshold-value candidate storage unit 103 will now be described.

Thresholds value in respective parts of color space into which the RGB color space has been partitioned have been stored in the threshold-value candidate storage unit 103 in the form of a three-dimensional look-up table, as mentioned above. According to this embodiment, RGB color space is partitioned into $N^3$-number of partial spaces obtained by dividing the R, G, B axes into N equal segments. It should be noted that N is assumed to be a power of 2. In order to simplify the description, this embodiment will be described on the assumption that N=4 holds and that the RGB data is 8-bit data.

Figure 3:
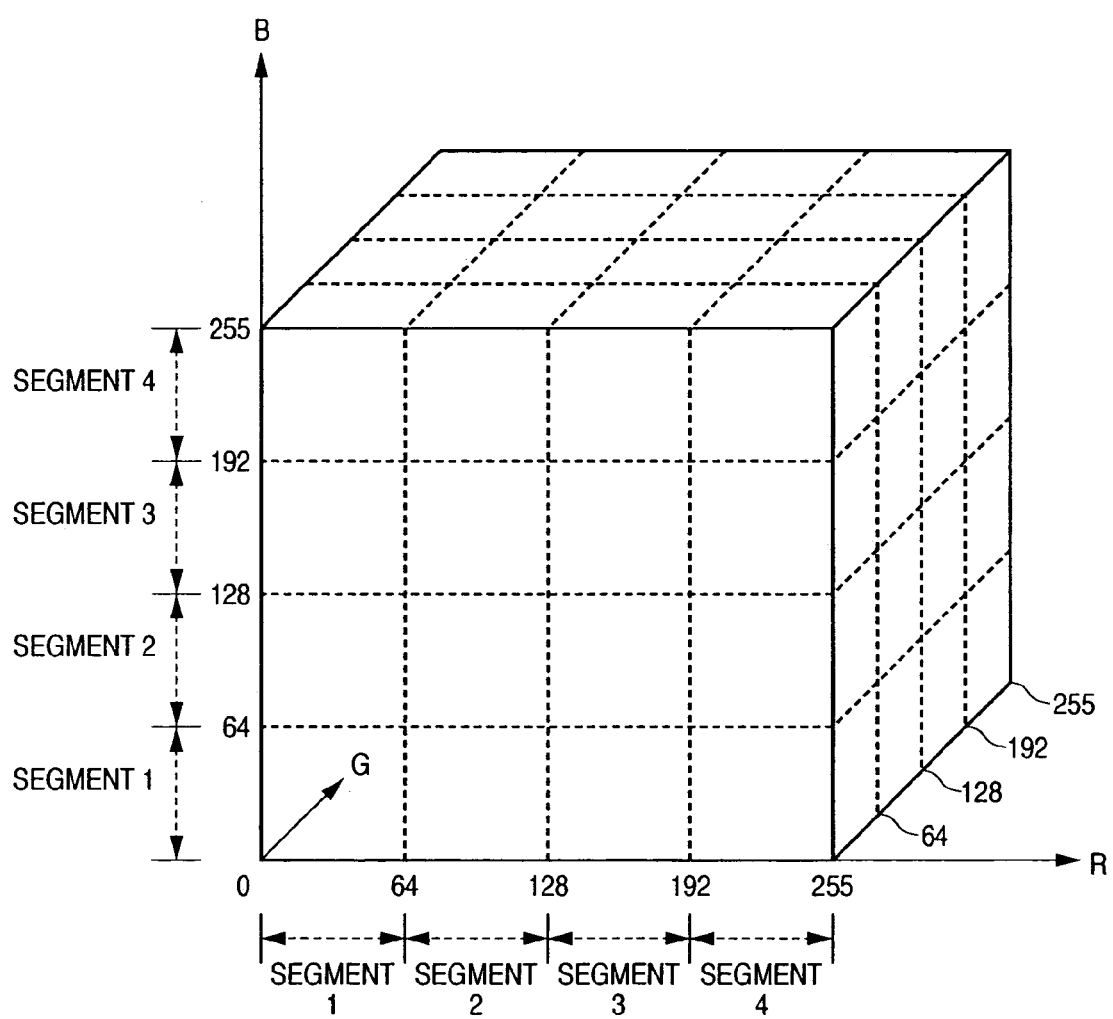
FIG. 3 is a diagram useful in describing the manner in which RGB color space is partitioned according to this embodiment.

FIG. 3 is a diagram useful in describing the manner in which RGB color space is partitioned according to this embodiment. For example, if N=4 holds, as shown in FIG. 3, then RGB color space is partitioned into a total of $4^3=64$ partial spaces and 64 threshold-value candidates are stored in the threshold-value candidate storage unit 103.

In other words, the image processing apparatus according to the above-described embodiment is characterized in that the threshold-value candidate storage unit 103 stores a threshold-value candidate for each of $N^3$-number of partial spaces obtained by dividing the R, G, B axes of RGB color space into N equal segments.

In order to specify each partial space, values between 0 and 255 of the 8-bit data shall be referred to as interval 1 (0 to 63), interval 2 (64 to 127), interval 3 (128 to 191) and interval 4 (129 to 255). Furthermore, the partial spaces shall be specified as (R interval, G interval, B interval)=(x, y, z). That is, x, y, z each takes on any of the values 1, 2, 3, 4.

According to this embodiment, it is assumed that 64 threshold-value candidates have been stored in the threshold-value candidate storage unit 103 in the following order:

| Order | | (R interval, G interval, B interval) | | | | | |
|---|---|---|---|---|---|---|---|
| 1st | ... | ( | 1 | , | 1 | , | 1 | ) |
| 2nd | ... | ( | 1 | , | 1 | , | 2 | ) |
| 3rd | ... | ( | 1 | , | 1 | , | 3 | ) |
| 4th | ... | ( | 1 | , | 1 | , | 4 | ) |
| 5th | ... | ( | 1 | , | 1 | , | 2 | , | 1 | ) |
| ... | ... | ( | ... | , | ... | , | ... | ) |
| 63rd | ... | ( | 4 | , | 4 | , | 3 | ) |
| 64th | ... | ( | 4 | , | 4 | , | 4 | ) |

That is, the values of the R interval, G interval, B interval are arrayed in ascending order in the following order: B→G→R Described next will be the method used at step S204 for calculating an address P of the three-dimensional look-up table of threshold-value candidates of each of the partial spaces. Here the partial space to which the reference color C1 belongs is specified and the address P of the three-dimensional look-up table in which the threshold-value candidate of this partial space has been stored is calculated. The address P is calculated in accordance with the following equation:

$$P = R1/64 \times 4 \times 4 + G1/64 \times 4 + B1/64$$
$$= R1/4 + G1/16 + B1/64$$

The above calculation can be performed at high speed using a bit shift because the divisors are powers of 2. The reason for this is that the number N used to divide RGB color space into the partial spaces is a power of 2. In other words, the image processing apparatus according to this embodiment is characterized in that the value of N is a power of 2 and high-speed calculation is made possible by using a bit shift to calculate the address of the three-dimensional look-up table.

Described next will be a method of calculating the partial-space threshold-value candidates (the processing of step S204 in FIG. 2) that have been stored in the threshold-value candidate storage unit 103. This will be described taking as an example the calculation of the threshold-value candidate of the partial space (R interval, G interval, B interval)=(1, 1, 1) [referred to as "partial space (1, 1, 1)" below].

First, in regard to any color Ct (Rt, Gt, Bt) of partial space (1, 1, 1), the RGB values of Ct are converted to L*a*b* values in CIELab color space, which is a uniform color space. The calculation equations involved in the conversion are as set forth above and need not be described again. The L*a*b* values obtained by the conversion shall be referred to as (L*t, a*t, b*t).

Next, a plurality of L*a*b* values for which the color difference with respect to (L*t, a*t, b*t) will be ΔE*ab=K are calculated. This is carried out by calculating L*a*b* values which, with respect to (L*t, a*t, b*t), are spaced away by K to the front and rear, to the left and right and above and below, or along diagonals, along the L*, a*, b* axes.

The calculated plurality of L*a*b* values spaced away by K are converted to respective ones of RGB data in RGB color space, the distances in RGB color space with respect to any color Ct in the partial space (1, 1, 1) are calculated and the average distance of these distances is calculated.

The processing for calculating the average distance in RGB color space with respect to the arbitrary color Ct is executed with regard to a plurality of colors that belong to the partial space (1, 1, 1), and the average value of each of the calculated average distances is adopted as the threshold value of the partial space (1, 1, 1). The threshold value thus calculated is the distance of the RGB color space that indicates a color difference of substantially the same degree as the color difference ΔE*ab=K in CIELab color space.

It should be noted that the accuracy of the correlation between the distance of each partial space in RGB color space and the color difference ΔE*ab=K will rise if the number N for dividing up RGB color space is enlarged. However, the threshold-value candidate storage unit 103 will require a greater number of storage areas to the extent that the value of N is increased. It should be noted that the calculation of threshold-value candidates need be performed only once in advance.

In accordance with the first embodiment as described above, whether the color difference between the two colors C1 and C2 in RGB color space, which is in conformity with sRGB color space, falls within a predetermined allowable range can be judged at high speed with approximately the same degree of accuracy as in a case where the judgment is made based upon the color difference ΔE*ab in uniform color space for which there is approximate correlation to human vision.

In the explanation relating to FIG. 3 above, an example in which an image in sRGB color space is processed is described. However, an input in another color space, e.g., ScRGB color space, can also be processed by previously preparing the three-dimensional LUT of FIG. 3 for this other color space. Further, when noise is removed from an image in sYCC color space where the image has been entered by a digital camera, the color difference judgment method of the present invention may be used to identify whether the colors of pixels neighboring a noise pixel are colors that are close to each other. That is, a color space that is not a certain uniform color space is delimited on a per-interval basis, as shown in FIG. 3, a threshold value indicating a range regarded as an approximately equal color difference in a uniform color space is obtained beforehand for each coordinate of the delimitation, and the threshold values are stored in the three-dimensional LUT (database). Then, when the aforesaid color image data C1, which is not in a uniform color space, is input, the coordinates of the three-dimensional LUT corresponding to this value C1 of color image data are accessed. As a result, a threshold value representing an allowable range regarded as a color in uniform color space approximately equal to the color data C1 is obtained and this threshold value is compared with the color difference between color image data C1 and C2, whereby it is possible to judge whether the color image C1 and the color image C2 can be regarded as being approximately equal in the uniform color space. In other words, when judging the color difference between first and second colors in a color space that is not a uniform color space, the difference between the first and second colors in the color space that is not the uniform color space is calculated, a prescribed threshold value is selected from a database in which a threshold value, which indicates an allowable range regarded as an approximately equal color difference in uniform color space, is stored for every coordinate of a prescribed interval in the color space that is not the uniform color space, the calculated distance and the selected threshold value are compared and, if the distance is equal to or less than the threshold value, it is decided that the color difference between the first and second colors lies within the allowable range.

Accordingly, when color difference is judged with regard to two items of color image data in color space that is not uniform color space, it can be determined whether two items of color image data will be seen substantially equally in terms of human vision without applying a complicated operation to color image data of color space that is not uniform color space to thereby change this color space to uniform color space.

Further, in a case where an (ICC) color profile has been appended to an image file to be processed, it can be judged from the color profile what kind of color-space image the image of this image file is and the above-described color difference judgment may be rendered using a three-dimensional LUT (already being retained within the apparatus) that corresponds to this color space. In a case where the digital camera or scanner that was used in generating an image to be processed can be identified, it will suffice to identify the color space of the image to be processed from the color profile of the digital camera or scanner and apply the above-described color difference judgment processing using a three-dimensional LUT corresponding to this color space.

Second Embodiment

In a second embodiment of the invention, the equation for calculation a color difference in CIELab color space differs from that of the first embodiment. Specifically, according to this embodiment, a CIE1994 color difference equation shown below is used as the equation for calculating color difference in CIELab color space.

$$\Delta E*94 = \{[\Delta H*ab/(1+0.015C*ab)]^2 + (\Delta L*/1.0)^2 + [\Delta C*ab/(1+0.045C*ab)]^2\}^{1/2}$$

where $\Delta H^*ab=[(\Delta E^*ab)^2-(\Delta L^*)^2-(\Delta C^*ab)^2]^{1/2}$ $\Delta L^*=L2^*-L1^*$ $\Delta C^*ab=C2^*-ab-C1^*ab$ The CIE1994 color difference equation is one that optimizes the color difference calculation equation in CIELab color space indicated below and corrects for a hue difference and a lightness difference. This makes it possible to calculate a color difference that more closely approximates the sense of human vision.

$\Delta E^*ab=[(\Delta L^*)^2+(\Delta a^*)^2+(\Delta b^*)^2]^{1/2}$ where $\Delta L^*=L2^*-L1^*$ $\Delta a^*=a2^*-a1^*$ $\Delta b^*=b2^*-b1^*$ Accordingly, the threshold-value candidates of the partial spaces in the threshold-value candidate storage unit 103 become values that more closely approximate those of the human sense of vision owing to use of the CIE1994 color difference method. That is, the image processing apparatus according to the second embodiment is characterized in that the distance calculating unit calculates a distance in RGB color space of the same extent as a color difference, which is based upon a CIE1994 color difference formula, between the first and second colors in CIELab color space.

Furthermore, in the first embodiment, data in RGB color space to undergo color difference judgment is handled as data in conformity with sRGB color space. However, the color space need not be sRGB color space but may be another RGB color space in which the conversion with respect to CIELab color space is uniquely decided by the calculation equations. Further, the color difference calculations in CIELab color space may be based on other color difference equations. That is, the image processing apparatus according to the second embodiment is characterized in that the distance calculating unit calculates a distance in RGB color space of the same extent as a color difference between the first and second colors in CIELab color space.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium (or storage medium) storing the program codes of the software for performing the functions of the foregoing embodiments to a system or an apparatus, reading the program codes with a computer (e.g., a CPU or MPU) of the system or apparatus from the recording medium, and then executing the program codes. In this case, the program codes read from the recording medium implement the novel functions of the embodiments and the recording medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the recording medium are written in a function expansion card inserted into the computer or in a memory provided in a function expansion unit connected to the computer, a CPU or the like contained in the function expansion card or function expansion unit performs a part of or the entire process in accordance with the designation of program codes and implements the functions of the above embodiments.

In a case where the present invention is applied to the above-mentioned recording medium, program code corresponding to the flowcharts described earlier would be stored on this recording medium.

Thus, in accordance with the present invention as described above, a judgment as to whether the color difference between two colors in RGB color space falls within a predetermined allowable range can be made to the same degree as the judgment is made based upon human vision.

The present invention is not limited to the above embodiments and various changes and modifications can be made within the spirit and scope of the present invention. Therefore, to apprise the public of the scope of the present invention, the following claims are made.

What is claimed is:

1. A system for judging a color difference between a first color and a second color in RGB color space, comprising:
a first calculator, arranged to calculate distance between the first and second colors in the RGB color space;
a storage, arranged to store a plurality of threshold values which respectively correspond to divisional spaces composing the RGB color space;
a selector, arranged to select a threshold value from the plurality of threshold values stored in said storage, wherein the threshold value to be selected corresponds to the divisional space containing one of the first and second colors;
a decider, arranged to compare the distance calculated by said first calculator and the threshold value selected by said selector, and to decide that the color difference between the first and second colors lies within an allowable range if the distance is equal to or less than the threshold value; and a second calculator, arranged to calculate the threshold value to be stored in said storage by the following steps:
  converting a voluntary color contained in the divisional space into a first value in a uniform color space;
  computing a plurality of second values spaced away by an allowable maximum value of the color difference from the first value in the uniform color space;
  converting the plurality of second values into plural colors in the RGB color space;
  computing an average distance between the voluntary color and the converted plural colors in the RGB color space;
  obtaining average distances for a plurality of voluntary colors contained in the divisional space by repeatedly executing the converting steps and the computing steps; and
  averaging the average distances to calculate the threshold value corresponding to the divisional space which contains the plurality of voluntary colors.

2. The system according to claim 1, wherein if RGB values of the first color are (R1, G1, B1) and RGB values of the second color are (R2, G2, B2), said first calculator calculates the distance by $(R1-R2)^2+(G1-G2)^2+(B1-B2)^2$.

3. The system according to claim 1, wherein if RGB values of the first color are (R1, G1, B1) and RGB values of the second color are (R2, G2, B2), said first calculator calculates the distance by $\sqrt{[(R1-R2)^2+(G1-G2)^2+(B1-B2)^2]}$.

4. The system according to claim 1, wherein said storage stores the threshold values as a three-dimensional look-up table,
and said selector makes either the first color or the second colors as a reference color and selects the threshold value uniquely upon referring to the three-dimensional look-up table based upon RGB values of the reference color.

5. The system according to claim 4, wherein said storage stores a threshold value for each of $N^3$-number of divisional spaces obtained by dividing each of R, G, B axes of the RGB color space into N equal segments.

6. The system according to claim 5, wherein the value of N is a power of 2 and high-speed calculation is made possible by using a bit shift to calculate an address of the three-dimensional look-up table.

7. The system according to claim 1, wherein said first calculator calculates a distance in the RGB color space of the same extent as a color difference, which is based upon a CIE1994 color difference formula, between the first and second colors in CIELab color space.

8. The system according to claim 1, wherein said first calculator calculates a distance in the RGB color space of the same extent as a color difference between the first and second colors in CIELab color space.

9. A method for judging a color difference between a first color and a second color in RGB color space, comprising the steps of:
  calculating distance between the first and second colors in the RGB color space;
  selecting a threshold value from a plurality of threshold values stored in a storage, wherein each threshold value corresponds to a divisional space divided from the RGB color space, and the threshold value to be selected corresponds to the divisional space containing one of the first and second colors;
  comparing the calculated distance and the threshold value selected;
  deciding that the color difference between the first and second colors lies within an allowable range if the distance is equal to or less than the threshold value; and
  calculating the threshold value to be stored in the storage by the following steps:
    converting a voluntary color contained in the divisional space into a first value in a uniform color space;
    computing a plurality of second values spaced away by an allowable maximum value of the color difference from the first value in the uniform color space;
    converting the plurality of second values into plural colors in the RGB color space;
    computing an average distance between the voluntary color and the converted plural colors in the RGB color space;
    obtaining average distances for a plurality of voluntary colors contained in the divisional space by repeatedly executing the converting steps and the computing steps; and
    averaging the average distances to calculate the threshold value corresponding to the divisional space which contains the plurality of voluntary colors.

10. A computer-readable storage media storing a computer executable program for causing a computer to implement a system according to claim 1.

* * * * *